Dec. 29, 1931.  C. W. HANSELL  1,838,763
METHOD AND MEANS FOR COMBINING ENERGIES
Filed April 12, 1928
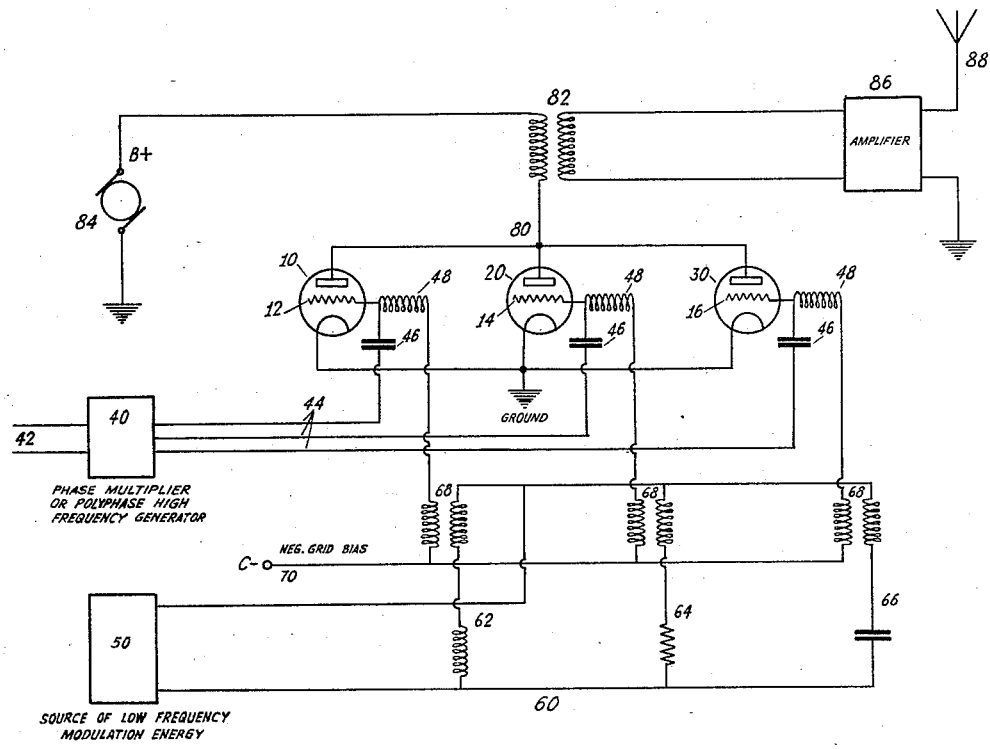
INVENTOR
CLARENCE W. HANSELL
BY
ATTORNEY Patented Dec. 29, 1931

1,838,763

UNITED STATES PATENT OFFICE

CLARENCE W. HANSELL, OF ROCKY POINT, NEW YORK, ASSIGNOR TO RADIO CORPORATION OF AMERICA, A CORPORATION OF DELAWARE

METHOD AND MEANS FOR COMBINING ENERGIES

Application filed April 12, 1928. Serial No. 269,356.

This invention relates to a method and means for combining energies, and more particularly to combining high frequency and modulating energies to obtain a side band for transmission.

For single side band transmission it has heretofore been customary to modulate the high frequency energy with the modulator energy in a carrier suppression modulator, leaving both side bands and the modulation frequency, and thereafter to filter out the the modulation frequency and either the difference or sum side band, leaving only one side band for utilization. It is an object of my invention to so combine energies that other energy of either the sum or difference frequency alone, and not both, is obtained, so that no discrimination by means of filters is required. This I do by obtaining each of the energies in polyphase form, modulating each phase of one energy with a corresponding phase of the other energy, and directly combining the modulated outputs.

With symmetrically distributed phases in each of the polyphase energies it will be appreciated that the direct combination of the various phases after modulation automatically eliminates each of the two combined frequencies. For this symmetrical phase relation I find it most convenient to employ three phase energy. The energies to be combined are not always available in three phase form, and to provide for such a case is a further object of my invention, which I do by the simple expedient of suitably multiplying the phase of either or both of the energies which are to be combined to obtain them in polyphase, and preferably three phase, form.

It may be shown that when the modulator outputs are combined, as described, not only the initial frequencies are neutralized, but also one of the two side bands. It is a further object of my invention to permit voluntary choice of which of the two side bands is produced, and this is accomplished by modulating each phase of one of the polyphase energies with that corresponding phase of the other polyphase energy which is equivalent to phase rotation in opposite or like directions, according as it is desired to obtain the sum or difference frequency. The operation of the invention may be described as being somewhat analogous to the operation of an induction motor frequency changer, from the rotor of which an output may be obtained the frequency of which is equal to the sum or difference of the frequency of the energy supplied to the field and the frequency of rotation of the rotor, according as the rotor is revolved by its driving motor in a direction opposite to or the same as the direction in which the field flux is rotating.

The invention is more fully described in the following specification, which is accompanied by a drawing showing a schematic wiring diagram of my invention.

Referring to that drawing it will be seen that there are three modulator tubes 10, 20 and 30, each having control electrodes 12, 14 and 16. There is a source of polyphase high frequency energy 40, which if supplied with direct current from the line 42 will be a polyphase generator of high frequency energy, and if supplied with single phase high frequency energy from the line 42 will be a phase multiplier. In the present modification the source 40 supplies three phase energy, which is connected, as shown, through the three phase line 44, and the radio frequency condensers 46, to the control electrodes of the modulator tubes, each phase of the three phase energy being coupled to the control electrode of a different one of the modulator tubes.

There is a source of modulator energy 50, which may be relatively low frequency keyed with code signals, and this is connected to a phase multiplier 60, which comprises phase modifying circuits 62, 64, 66, which are inductive, resistive, and capacitive, respectively, to the extent necessary, relative to the resistance of the circuits during operation, to obtain the desired phase displacement needed to convert the single phase modulator energy to three phase energy. In the terminology of this specification the phase multiplier 60, like the high frequency polyphase source 40, is considered to be, broadly, a source of polyphase energy.

Each of the phase modifying circuits is coupled through coupling transformers 68 to the control electrodes of a different one of the modulator tubes 10, 20 and 30. The neutral or common connection of the three phase modulation circuits 70 is connected to a source of negative grid bias of suitable value to give the modulator tubes the desired operating characteristic. The high frequency chokes 48 and the low frequency blocking condensers 46 serve to insulate the high and low frequency circuits respectively from the low and high frequency energies.

The anodes of the tubes 10, 20 and 30 are directly connected together to form a combining circuit 80, which includes a coupling transformer 82, and which is connected to a suitable source of direct anode potential 84. The secondary of the transformer 82 leads to a power amplifier 86, the output from which is fed to a radiating circuit 88.

That only one side band of the combined energy is produced in the combining circuit 80, may be demonstrated as follows: Expressing the frequencies in terms of angular velocity, and letting the frequency of one energy be $W_1$, and the frequency of the other energy be $W_2$, and letting the instantaneous position of phase one of each of the three phase energies be expressed by $W_1t$ and $W_2t$, then phase two of each of the three phase energies may be expressed by $W_1t+120°$ and $W_2t+120°$, and phase three of each of the three phase energies may be expressed by $W_1t+240°$ and $W_2t+240°$.

In general, when two frequencies are combined through any device of asymmetric characteristic there is obtained energy of each of the frequencies and energy of the sum and difference frequencies. From each of the modulators there is obtained, therefore, energies of the following frequencies: $W_1$, $W_2$, $(W_1+W_2)$, and $(W_1-W_2)$. In the first modulator the phase relations are $W_1t$, $W_2t$, $(W_1t+W_2t)$, and $(W_1t-W_2t)$. In the second modulator the phase relationship is altered by the addition of the constant angle of $120°$, giving $(W_1t+120°)$, $(W_2t+120°)$, $(W_1t+120°+W_2t+120°)$, and $(W_1t+120°-W_2t-120°)$. In the third modulator the phase relationship is $(W_1t+240°)$, $(W_2t+240°)$, $(W_1t+240°+W_2t+240°)$, and $(W_1t+240°-W_2t-240°)$. By adding the terms within the parentheses, remembering that angular differences greater than $360°$ may be replaced by their difference from $360°$, it is found that all of the energy of frequencies $W_1$, $W_2$, and $W_1+W_2$, is reduced to zero when directly combined, because in each case there are three equal components relatively displaced $120°$. For the difference frequency $W_1-W_2$ it is found that the three components from the modulation of the phases one, two and three all add cophasially, showing that when combining the energies, so that their phase rotation is in the same direction only the difference frequency is obtained.

In a similar manner by initially rotating the three phase energies in opposite directions, so that minus $120°$ and minus $240°$ are added to the phase $W_2t$, and by carrying out the same operations, it is found that the components of the frequency $W_1+W_2$ in all three modulators are cophasial, while the other frequencies are neutralized.

The conclusion is obvious by inspection if the results are put in tabular form as follows:

*Similar phase rotation*

| Frequency | $W_1$ | $W_2$ | $W_1+W_2$ | $W_1-W_2$ |
|---|---|---|---|---|
| Phase 1 | $W_1t$ | $W_2t$ | $W_1t+W_2t$ | $W_1t-W_2t$ |
| Phase 2 | $W_1t+120°$ | $W_2t+120°$ | $W_1t+W_2t+240°$ | $W_1t-W_2t+0$ |
| Phase 3 | $W_1t+240°$ | $W_2t+240°$ | $W_1t+W_2t+480°\ (=120°)$ | $W_1t-W_2t+0$ |
| Resultant | 0 | 0 | 0 | $3(W_1-W_2)$ |

*Opposite phase rotation*

| Frequency | $W_1$ | $W_2$ | $W_1+W_2$ | $W_1-W_2$ |
|---|---|---|---|---|
| Phase 1 | $W_1t$ | $W_2t$ | $W_1t+W_2t$ | $W_1t-W_2t$ |
| Phase 2 | $W_1t+120°$ | $W_2t-120°$ | $W_1t+W_2t+0$ | $W_1t-W_2t+240°$ |
| Phase 3 | $W_2t+240°$ | $W_2t-240°$ | $W_1t+W_2t+0$ | $W_1t-W_2t+480°\ (=120°)$ |
| Resultant | 0 | 0 | $3(W_1+W_2)$ | 0 |

It is clear that this invention is applicable to modulation by telephone currents if three phase telephone currents are available, and even from single phase speech current provided that a suitable phase multiplier for speech can be devised.

In transmitters such as I have disclosed in my copending applications Serial Number 207,114, filed July 20, 1927 and Serial Number 212,192, filed Aug. 11, 1927, where speech or multiplex code tone signals are used to frequency or side band modulate energy of intermediate frequency, which in turn is used to side band modulate energy of high frequency, the percentage of frequency charge in the intermediate frequency is sufficiently small to make phase displacement by the means here disclosed perfectly feasible.

In the claims which follow I shall, therefore, by the term sum or difference frequency, include the broader case of sum or difference side band.

I claim:

1. The method of combining energies to obtain other energy of either the sum or difference frequency alone which includes obtaining each of the energies in three phase form, modulating each phase of one of the energies with a corresponding phase of the other energy, and combining the modulated three phase outputs thereby obtaining the sum or difference frequency alone.

2. The method of combining a three phase and a single phase energy to obtain a single phase energy of either the sum or difference frequency alone which includes changing the single phase energy to three phase energy, modulating each phase of one of the three phase energies with a corresponding phase of the other three phase energy, and combining the modulated three phase outputs.

3. The method of combining single phase energies to obtain single phase energy of either the sum or difference frequency alone which includes changing each single phase energy to three phase energy, modulating each phase of one of the three phase energies with a corresponding phase of the other three phase energy, and combining the modulated three phase outputs.

4. The method of combining a three phase and a single phase energy to obtain single phase energy of either the sum or difference frequency alone which includes changing the single phase energy to three phase energy, modulating each phase of one of the three phase energies with that corresponding phase of the other three phase energy which is equivalent to phase rotation in opposite or like directions according as the sum or difference frequency is desired, and combining the modulated three phase outputs.

5. An arrangement for obtaining the sum or difference frequency alone when combining three phase energies comprising a source of three phase energy of one of the frequencies, a source of three phase energy of the other of the frequencies, three modulators, means coupling each phase of one of the three phase energies and a corresponding phase of the other three phase energy to a different one of the modulators, and a combining circuit for combining the modulator outputs.

6. An arrangement for obtaining the sum or difference frequency alone when combining a three phase energy and a single phase energy comprising means for changing the single phase energy to three phase energy, three modulators, means coupling each phase of one of the three phase energies and a corresponding phase of the other three phase energy to a different one of the modulators, and a combining circuit for combining the modulator outputs.

7. An arrangement for obtaining single phase energy of the sum or difference frequency alone when combining single phase energies comprising means to change each of the single phase energies to three phase energy, three modulators, means coupling each phase of one of the three phase energies and a corresponding phase of the other three phase energy to a different one of the modulators, and a combining circuit for combining the modulator outputs.

8. An arrangement for obtaining single phase energy of the sum or difference frequency alone when obtaining a three phase and a single phase energy comprising means for changing the single phase energy to three phase energy, three modulators, means coupling each phase of one of the three phase energies and that corresponding phase of the other three phase energy which is equivalent to phase rotation in opposite or like directions according as the sum or difference frequency is desired, and a combining circuit for combining the modulator outputs.

9. An arrangement for obtaining single phase energy of the sum or difference frequency alone when combining a three phase and a single phase energy comprising three electron emission tubes having control electrode and anode circuits, means coupling each phase of the three phase energy to the control electrode circuit of a different one of the modulator tubes, means for changing the single phase energy to three phase energy including phase modifying inductance, capacitance, and resistance, means coupling each of the phase of the phase multiplied single phase energy to the control electrode circuit of a different one of the modulator tubes, a combining circuit directly connected to the anodes of the modulator tubes, and an output circuit coupled to the combining circuit.

10. A single side band transmitter comprising a source of three phase radio frequency energy, a source of single phase modulator energy, a phase multiplier for changing the single phase modulator energy to three phase modulator energy, three modulator tubes having control electrodes and anodes, means coupling each of the phases of the three phase radio frequency energy and a corresponding phase of the three phase modulator energy to the control electrode of a different one of the modulator tubes, a combining circuit directly connected to the anodes of the modulator tubes, an amplifier coupled to the combining circuit, and a radiating circuit coupled to the amplifier.

CLARENCE W. HANSELL.